(12) United States Patent
Sugimoto et al.

(10) Patent No.: US 11,227,491 B2
(45) Date of Patent: Jan. 18, 2022

(54) INFORMATION ANALYSIS DEVICE AND INFORMATION ANALYSIS METHOD

(71) Applicant: HONDA MOTOR CO., LTD., Tokyo (JP)

(72) Inventors: Yoshiaki Sugimoto, Tokyo (JP); Tadashi Kurihara, Tokyo (JP); Minoru Fukumori, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/044,137

(22) PCT Filed: Feb. 18, 2019

(86) PCT No.: PCT/JP2019/005783
§ 371 (c)(1),
(2) Date: Sep. 30, 2020

(87) PCT Pub. No.: WO2019/193847
PCT Pub. Date: Oct. 10, 2019

(65) Prior Publication Data
US 2021/0027618 A1  Jan. 28, 2021

(30) Foreign Application Priority Data
Apr. 3, 2018  (JP) .............................. JP2018-071348

(51) Int. Cl.
*G08G 1/017* (2006.01)
*G08G 1/056* (2006.01)
(Continued)

(52) U.S. Cl.
CPC ............. *G08G 1/017* (2013.01); *G08G 1/056* (2013.01); *G08G 1/13* (2013.01); *G08G 1/205* (2013.01)

(58) Field of Classification Search
CPC ........ G08G 1/017; G08G 1/015; G08G 1/054; G08G 1/056; G08G 1/13; G08G 1/205;
(Continued)

(56) References Cited

U.S. PATENT DOCUMENTS

2004/0145658 A1* 7/2004 Lev-Ran .......... G08B 13/19656
348/143
2015/0300837 A1* 10/2015 Hisano ............... G06Q 30/0266
701/454
(Continued)

FOREIGN PATENT DOCUMENTS

JP  H10-027294 A  1/1998
JP  2001-143184 A  5/2001
(Continued)

OTHER PUBLICATIONS

International Search Report, International Application No. PCT/JP2019/005783, dated Apr. 23, 2019, 2 pages.

*Primary Examiner* — Emily C Terrell
(74) *Attorney, Agent, or Firm* — Rankin, Hill & Clark LLP

(57) ABSTRACT

An information analysis device is provided with: a visit information database update unit that receives position information pertaining to a plurality of vehicles; a storage unit that stores map information including the position of a facility that the plurality of vehicles can visit, and a route on which the plurality of vehicles can travel; and a visit rate calculation unit that specifies information pertaining to a visit to the facility by the moving body and a number of moving bodies passing through a region that corresponds to the facility on the basis of the position information and the map information, and calculates the rate at which the moving body visits the facility on the basis of the result of specification.

5 Claims, 8 Drawing Sheets

(51) Int. Cl.
*G08G 1/13* (2006.01)
*G08G 1/00* (2006.01)

(58) Field of Classification Search
CPC ............ G08G 1/00; G08G 1/012; G08G 1/01;
G08G 1/0129; G08G 1/065; G08G
1/0112; H04W 4/00
USPC ........................................................ 340/935
See application file for complete search history.

(56) References Cited

U.S. PATENT DOCUMENTS

| | | | |
|---|---|---|---|
| 2016/0364739 | A1 | 12/2016 | Dann et al. |
| 2018/0252541 | A1* | 9/2018 | Kesting .............. G01C 21/3415 |
| 2020/0132493 | A1* | 4/2020 | Fukumori ........ G08G 1/096888 |
| 2020/0365015 | A1* | 11/2020 | Nguyen ............... G08G 1/0133 |
| 2021/0125196 | A1* | 4/2021 | Sugimoto .............. G06Q 50/10 |

FOREIGN PATENT DOCUMENTS

| | | |
|---|---|---|
| JP | 2010-238004 A | 10/2010 |
| JP | 2014-229250 A | 12/2014 |
| JP | 2016-045949 A | 4/2016 |

\* cited by examiner

FIG. 5

VISIT INFORMATION DATABASE

| FACILITY IDENTIFICATION INFORMATION | MOVEMENT DATE/TIME | MOVING BODY IDENTIFICATION INFORMATION | MOVEMENT ROUTE INFORMATION |
|---|---|---|---|
| abc123 | 2018// | ... | ... |
| | 2018// | ... | ... |
| | 2018// | ... | ... |
| | ⋮ | ⋮ | ⋮ |
| | 2018// | ... | ... |
| efg456 | 2018// | ... | ... |
| | 2018// | ... | ... |
| | 2018// | ... | ... |
| | ⋮ | ⋮ | ⋮ |
| | 2018// | ... | ... |
| ⋮ | ⋮ | ⋮ | ⋮ |
| xyz789 | 2018// | ... | ... |
| | 2018// | ... | ... |
| | 2018// | ... | ... |
| | ⋮ | ⋮ | ⋮ |
| | 2018// | ... | ... |

FIG. 6

ANALYSIS INFORMATION DISPLAY EXAMPLE

| DAY OF THE MONTH | NUMBER OF PASSING IN FRONT OF FACILITY (THOUSAND) | NUMBER OF VISITS (VEHICLES) | MOVING BODY VISIT RATIO (%) |
|---|---|---|---|
| SEPTEMBER 1ST | ... | ... | ... |
| SEPTEMBER 2ST | ... | ... | ... |
| SEPTEMBER 3ST | ... | ... | ... |
| SEPTEMBER 4ST | ... | ... | ... |
| SEPTEMBER 5ST | ... | ... | ... |
| SEPTEMBER 6ST | ... | ... | ... |
| SEPTEMBER 7ST | ... | ... | ... |
| SEPTEMBER 8ST | ... | ... | ... |
| SEPTEMBER 9ST | ... | ... | ... |
| SEPTEMBER 10TH | ... | ... | ... |
| SEPTEMBER 11ST | ... | ... | ... |
| SEPTEMBER 12ST | ... | ... | ... |
| SEPTEMBER 13ST | ... | ... | ... |
| SEPTEMBER 14ST | ... | ... | ... |
| SEPTEMBER 15ST | ... | ... | ... |
| SEPTEMBER 16ST | ... | ... | ... |
| SEPTEMBER 17ST | ... | ... | ... |
| SEPTEMBER 18ST | ... | ... | ... |
| SEPTEMBER 19ST | ... | ... | ... |
| SEPTEMBER 20TH | ... | ... | ... |
| SEPTEMBER 21ST | ... | ... | ... |
| SEPTEMBER 22ST | ... | ... | ... |
| SEPTEMBER 23ST | ... | ... | ... |
| SEPTEMBER 24ST | ... | ... | ... |
| SEPTEMBER 25ST | ... | ... | ... |
| SEPTEMBER 26ST | ... | ... | ... |
| SEPTEMBER 27ST | ... | ... | ... |
| SEPTEMBER 28ST | ... | ... | ... |
| SEPTEMBER 29ST | ... | ... | ... |
| SEPTEMBER 30TH | ... | ... | ... |

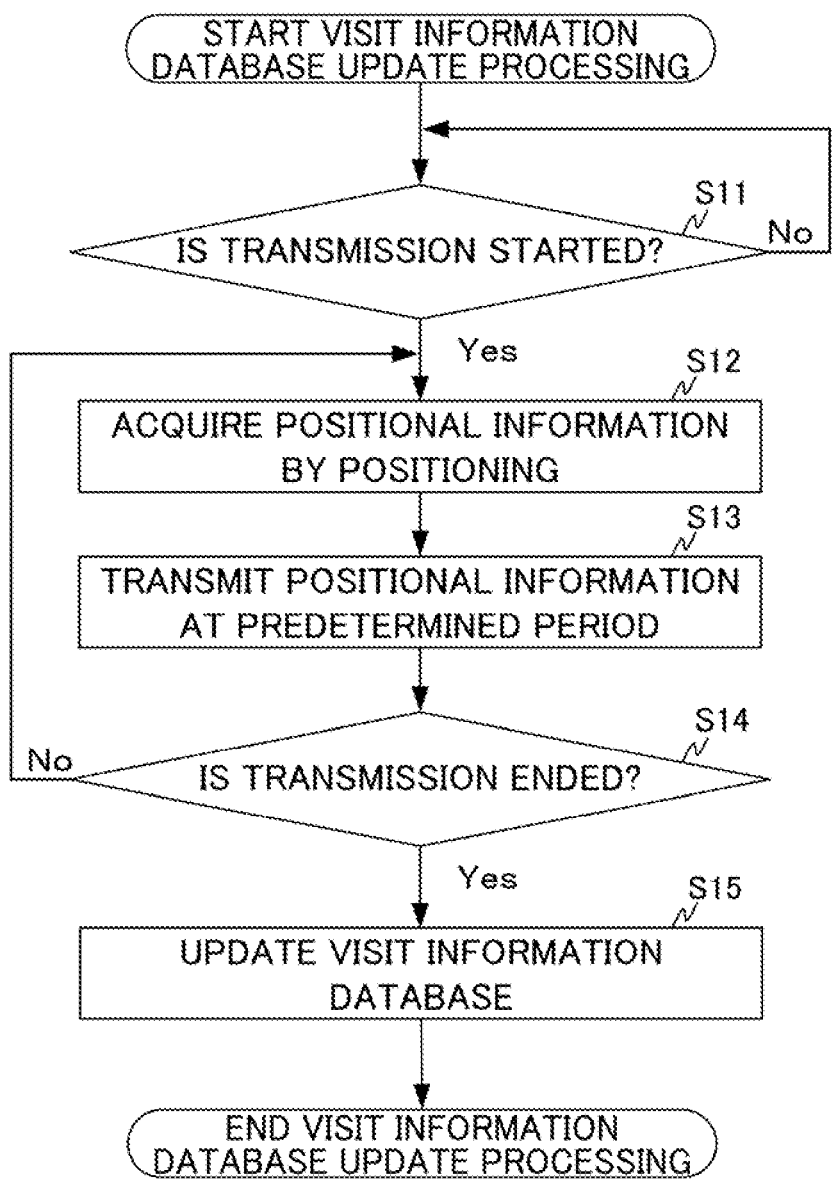

INFORMATION ANALYSIS DEVICE AND INFORMATION ANALYSIS METHOD

TECHNICAL FIELD

The present invention relates to an information analysis device and an information analysis method for performing information analysis on a moving body.

BACKGROUND ART

Conventionally, technology has been known which acquires positional information of a moving body such as an automobile, and uses the acquired positional information. An example of such technology using positional information is disclosed in Patent Document 1. With the technology disclosed in Patent Document 1, based on the time data made while turning OFF the engine of a vehicle, it is possible to analyze whether a user visited a facility by a vehicle. The analysis results thereof can be used by the operator of the facility in order to review the ability of the facility to attract customers.

Patent Document 1: Japanese Unexamined Patent Application, Publication No. 2016-045949

DISCLOSURE OF THE INVENTION

Problems to be Solved by the Invention

However, with the aforementioned technology disclosed in Patent Document 1, analysis based on only the number of visits is merely conducted. In addition to analysis based on only such a number of visits, it is desirable to users if able to conduct more detailed analysis.

Therefore, the present invention has an object of providing an information analysis device and information analysis method capable of performing more detailed analysis based on information such as positional information of moving bodies.

Means for Solving the Problems

An information analysis device (for example, the information analysis device 30 described later) according to a first aspect of the present invention includes: a receiving unit (for example, the visit information databased update unit 311 described later) which receives positional information of a plurality of moving bodies (for example, the vehicle 50 described later); a map information storage unit (for example, the storage unit 32 described later) which stores map information including roads which can be travelled by the plurality of moving bodies, and a position of a facility which can be visited by the plurality of moving bodies; a visit ratio calculation unit (for example, the visit ratio calculation unit 313 described later) which specifies information related to visits to a facility by the moving body, and a number of moving bodies having passed within a region corresponding to the facility based on the positional information and the map information, and calculates a moving body visit ratio to the facility, based on specification results.

According to the above first aspect, it is possible to understand an overall traffic value from a travelled amount, and possible to calculate a visit ratio to a facility.

According to a second aspect of the present invention, the information analysis device as described in the first aspect may be configured so that the visit ratio calculation unit specifies a number of moving bodies having visited the facility, as information related to visits to the facility by the moving body, and calculates the moving body visit ratio by dividing a number of moving bodies having visited the facility, by a number of moving bodies having passed within a region corresponding to the facility.

According to the above second aspect, it is possible to calculate a visit ratio to a facility, by considering the number of moving bodies having visited the facility, and a number of moving bodies having passed within a region corresponding to the facility.

According to a third aspect of the present invention, the information analysis device as described in the first aspect or second aspect may be configured so that the visit ratio calculation unit specifies whether the moving body turned right or turned left to the facility from a road, as information related to visits to the facility by the moving body, and calculates either one or both of the moving body visit ratio to the facility for moving bodies that turned right, and a moving body visit ratio to the facility for moving bodies that turned left.

According to the above third aspect, it is possible to perform analysis which more accurately reflects traffic flow, by performing right/left turn entry determination.

According to a fourth aspect of the present invention, the information analysis device as described in any one of the first to third aspects may be configured so as to further include an input unit (for example, the analysis condition acceptance unit 312 described later) configured to designate any position on a road in the map information, in which the visit ratio calculation unit calculates, relative to a position designated by the input unit, a virtual moving body visit ratio using a moving body visit ratio to a facility existing on a road which is the same as the position designated by way of the input unit.

According to the above fourth aspect, it is possible to more accurately predict the visit number in the case of newly opening a store, and perform comparison between stores. In addition, it is possible to apply this prediction result or comparison result, in the case of the facility being store, for example, to consulting services for new store opening, or the like.

An information analysis method according to a fifth aspect of the present invention is an information analysis method performed by a computer (for example, the information analysis device 30 described later), the method including the steps of: receiving positional information of a plurality of moving bodies (for example, the vehicle 50 described later); storing map information which includes roads which can be travelled by the plurality of moving bodies, and a position of a facility which can be visited by the plurality of moving bodies; and specifying information related to visits to a facility by the moving body and a number of moving bodies having passed within a region corresponding to the facility based on the positional information and the map information, and calculating a moving body visit ratio to the facility, based on a result of specifying.

According to the method of the above fifth aspect, the same effects as the information analysis device of the above first aspect are exerted.

Effects of the Invention

According to the present invention, it becomes possible to perform more detailed analysis based on information such as positional information of moving bodies.

BRIEF DESCRIPTION OF THE DRAWINGS

FIG. 5 is a view showing an example of a visit information database according to an embodiment of the present invention;

FIG. 6 is a view showing an example of the display of analysis information according to an embodiment of the present invention;

FIG. 7 is a flowchart showing basic operations during update processing of the visit information database according to an embodiment of the present invention.

PREFERRED MODE FOR CARRYING OUT THE INVENTION

Hereinafter, a preferred embodiment of an information analysis system of the present invention will be explained in detail while referencing the drawings.

<Overall Configuration of Information Analysis System 1>

Figure 1:
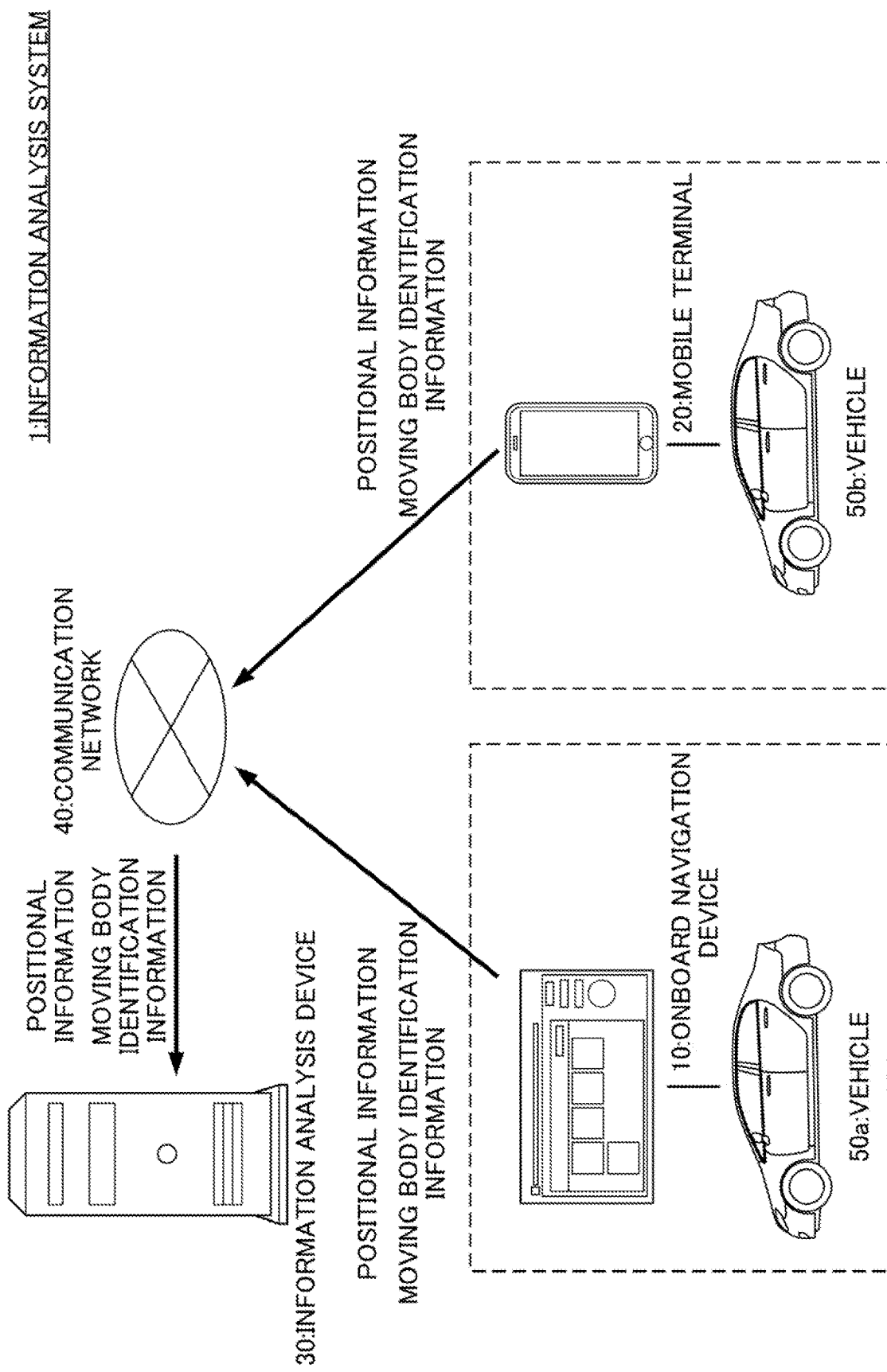
FIG. 1 is a block diagram showing the basic configuration of an overall information analysis system, which is an embodiment of the present invention.

An information analysis system 1 according to a preferred embodiment of the present invention will be explained. FIG. 1 shows the overall configuration of the information analysis system 1.

As shown in FIG. 1, the information analysis system 1 is configured to include an onboard navigation device 10, mobile terminal 20, and information analysis device 30. These respective devices and terminals are connected to be able to communicate with each other via a communication network 40. It should be noted that, in the drawings, although illustrating information transmitted between these respective devices and terminals, this information is only an example ultimately. In the present embodiment, information other than that illustrated may be transmitted.

The onboard navigation device 10 is a device which performs navigation (route guidance) to a user riding in a vehicle 50a. The onboard navigation device 10 performs route guidance from the current position until a destination, based on the request of a user. In addition, the onboard navigation device 10 also has a function of measuring the positional information (i.e. positional information of the vehicle 50a) of the onboard navigation device 10. The positional information measured by the onboard navigation device 10 is sent as appropriate to the information analysis device 30, together with moving body identification information for identifying the vehicle 50a. The onboard navigation device 10 can be realized by a car navigation device installed in the vehicle 50a serving as the moving body, or a PND (Portable Navigation Device) which is easily installed in the vehicle 50a serving as the moving body and is portable. In addition, the onboard navigation device 10 otherwise can be realized by an electronic device such as a smartphone on which a predetermined application has been installed.

The mobile terminal 20 is a mobile terminal used by a user riding in a vehicle 50b. The mobile terminal 20 has a function of measuring positional information of the mobile terminal 20 (i.e. positional information of the vehicle 50b), similarly to the aforementioned onboard navigation device 10. The positional information measured by the mobile terminal 20 is sent as appropriate to the information analysis device 30, along with the moving body identification information for identifying the vehicle 50b, similarly to the positional information measured by the onboard navigation device 10. It should be noted that the moving body identification information may be acquired by the mobile terminal 20 from the vehicle 50b, and the identification information of the mobile terminal 20 itself may be considered as the moving body identification information. The mobile terminal 20 can be realized by a smartphone, mobile phone, tablet terminal, notebook computer or other portable electronic device on which a predetermined application is installed.

It should be noted that, although the drawings illustrate the group of the onboard navigation device 10 and vehicle 50a and the group of the mobile terminal 20 and vehicle 50b as pairs, respectively, the number of these groups is not particularly limited. In addition, in the following explanation, in the case of explaining the vehicle 50a to which the onboard navigation device 10 is mounted, or the vehicle 50b in which the user using the mobile terminal 20 is riding without distinguishing therebetween, the Latin character suffix is omitted, and is simply called "vehicle 50".

The information analysis device 30 is a device which performs detailed analysis based on positional information, etc. of each vehicle 50 serving as a moving body, as unique processing of the present embodiment. More specifically, the information analysis device 30 acquires positional information of each vehicle 50, from the onboard navigation device 10 and mobile terminal 20. In addition, the information analysis device 30 creates a visit information database storing data related to visits to a facility by each vehicle 50, based on the positional information of each vehicle 50. Furthermore, the information analysis device 30 stores map information including the roads on which each vehicle 50 can travel, and the position of a facility to which each vehicle 50 can visit.

Furthermore, the information analysis device 30 accepts analysis conditions inputted from the user using the analysis information in order to obtain analysis information according to the desired conditions of the user. Herein, analysis conditions are conditions including designations of stores, etc. established as targets of analysis for generating analysis information. Details of the analysis conditions are described later by referencing FIG. 4.

Then, the information analysis device 30 performs analysis according to the accepted analysis conditions, based on information in the visit information database, and map information. For example, the information analysis device 30 determines a facility designed by the analysis conditions as a facility which is an analysis target. In addition, based on the information within the visit information database and the map information, the number of vehicles 50 visiting a facility defined as the analysis target, and the number of vehicles 50 having passed through a region corresponding to the facility defined as the analysis target are specified.

Moreover, the information analysis device 30 calculates a moving body visit ratio, by dividing the number of vehicles 50 having visited the facility defined as the analysis target by the number of vehicles 50 having passed through the region corresponding to the facility. By configuring in this way, the information analysis device 30 can perform analysis according to the accepted analysis conditions, based on information such as the positional information acquired form the vehicle 50 serving as the moving body.

In addition, the information analysis device 30 presents to the user the analysis information such as the moving body visit ratio calculated in this way. In other words, the user can obtain analysis information according to the desired analysis conditions inputted by themselves.

The user can use this analysis information presented from the information analysis device 30 in various applications. In this regard, with the general technology, since analysis based only on the number of visits by vehicles has been conducted, it has been difficult to distinguish the reason for visiting to a facility is due to location, due to brand recognition, or another factor. To address this, according to the information analysis device 30, it is possible to conduct further analysis upon considering not only the number of visits, but also the number of moving bodies having passed within the region corresponding to the aforementioned facility.

For this reason, the user, for example, can more easily perform distinctions such as the reason for visiting to a facility is due to location, due to brand recognition of the facility or another factor, by comparing the moving body visit ratio, etc. of each of a plurality of facilities in the same such location facing the same road.

It should be noted that the user employing the analysis information of the present embodiment, for example, may be a business person operating a store that is considering opening a new store, or may be a consultant conducting consulting to this business person. In other words, the analysis information of the present embodiment can be employed in various ways by various users.

Such an information analysis device 30, for example, can be realized by incorporating software for realizing the present embodiment into a server device or personal computer.

The communication network 40 is realized by a network such as the Internet or mobile phone network, or a network combining these. In addition, a LAN (Local Area Network) may be included in part of the network.

The vehicle 50 is a moving body in which the user of the onboard navigation device 10 or mobile terminal 20 rides. The vehicle 50, for example, is realized by a four-wheeled automobile, two-wheeled automobile, bicycle or the like.

<Functional Blocks Equipped to Onboard Navigation Device 10>

Next, the functional blocks equipped to the onboard navigation device 10 will be explained by referencing the block diagram of FIG. 2. Herein, the onboard navigation device 10 receives the supply of electrical power from the vehicle 50a, and automatically starts up by the ignition switch of the vehicle 50a being turned ON (starting engine) by the user riding in the vehicle 50a. Then, the onboard navigation device 10 operates until the ignition switch of the vehicle 50a is turned OFF (stopping engine) by the user riding in the vehicle 50a.

Figure 2:
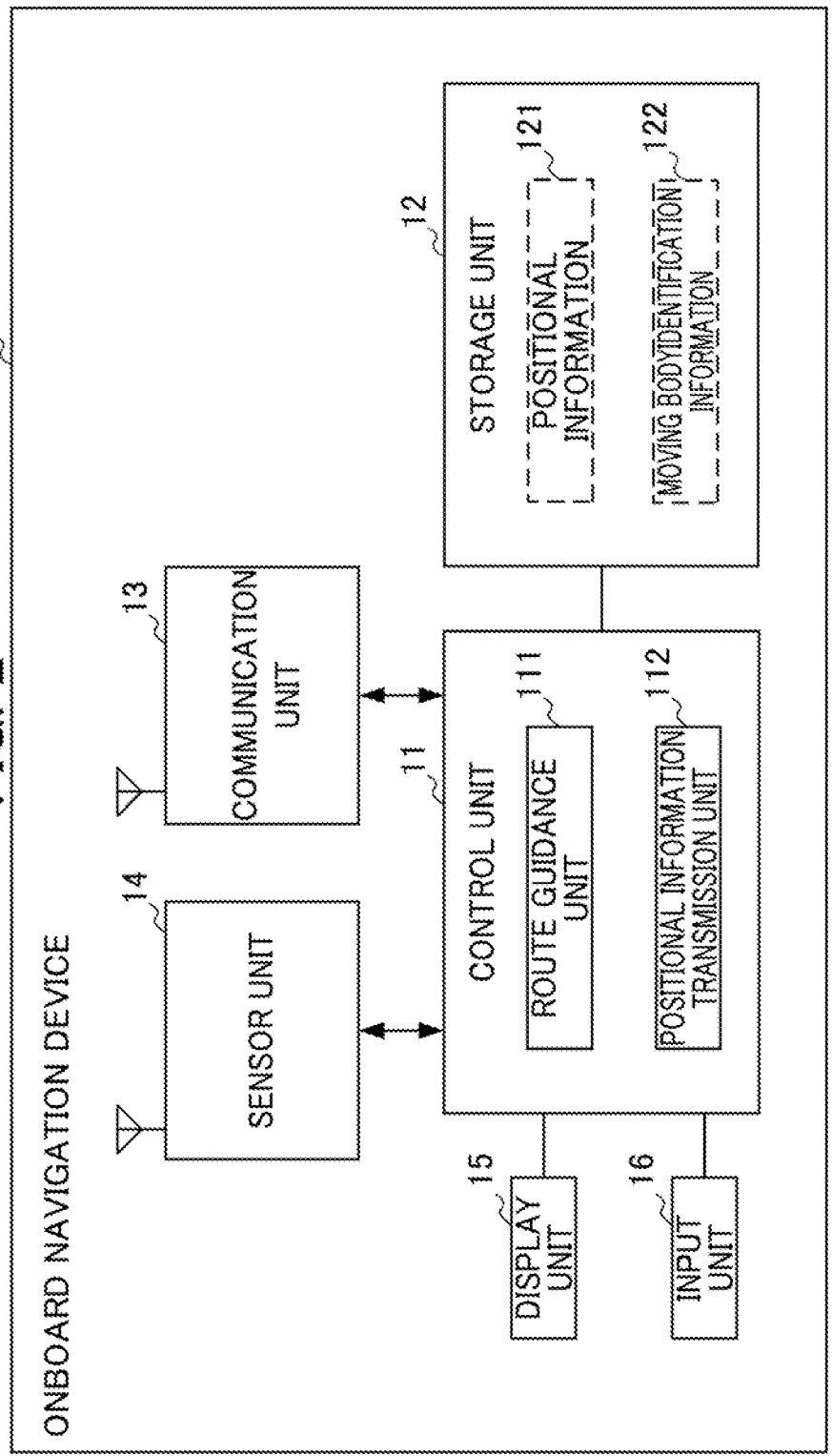
FIG. 2 is a functional block diagram showing the functional configuration of an onboard navigation device according to an embodiment of the present invention.

As shown in FIG. 2, the onboard navigation device 10 is configured to include a control unit 11, storage unit 12, communication unit 13, sensor unit 14, display unit 15 and input unit 16.

The control unit 11 is configured from an arithmetic processing device such as a microprocessor, and performs control of each part constituting the onboard navigation device 10. The details of the control unit 11 will be described later.

The storage unit 12 is configured by semiconductor memory or the like, and each of the programs such as a program for control called firmware or an operating system, program for performing route guidance processing, and program for performing transmission processing of positional information in the information analysis device 30, and other than this, various information such as map information are stored therein. The drawing shows positional information 121 and moving body identification information 122, which are information particularly related to transmission processing of positional information, as information stored by the storage unit 12.

The positional information 121 is positional information (i.e. positional information of the vehicle 50a) of the onboard navigation device 10 measured by the sensor unit 14 described later. The positional information 121 is configured not only as information indicating the measured position, but also includes the time at which conducting measurement. In addition, the moving body identification information 122 is information for identifying the onboard navigation device 10. As the moving body identification information 122, it is possible to employ a serial number or the like uniquely assigned to the onboard navigation device 10, for example. In addition, in order for the communication unit 13 to connect to a communication network 40, which is a network such as a mobile phone network, it is possible to use the telephone number assigned to the SIM (Subscriber Identity Module) inserted in the communication unit 13 as the moving body identification information 122. In addition, it is possible to use the VIN (vehicle identification number) uniquely assigned to the vehicle 50a or number of the number plate as the moving body identification information 122.

The respective information stored in this storage unit 12 may be established as a configuration storing in advance in the storage unit 12, or may be established as a configuration to be appropriately downloaded as needed from a server device (omitted from illustration), etc. connected to the communication network 40. Furthermore, it may be corrected as appropriate in response to input or the like from the user.

The communication unit 13 has a DSP (Digital Signal Processor), etc., and realizes wireless communication with other devices (for example, the information analysis device 30) via the communication network 40, according to a standard such as 3G (3rd Generation), LTE (Long Term Evolution), 4G (4th Generation), or Wi-Fi (registered trademark). The communication unit 13, for example, is used in order for the positional information transmission unit 112 described later to transfer the positional information 121 and moving body identification information 122 stored in the storage unit 12 to the information analysis device 30. However, there is no particular limitation in the data transmitted between the communication unit 13 and other devices, and may be configured so that information other than the positional information 121 and moving body identification information 122 is transmitted.

The sensor unit 14 is configured by a GPS (Global Positioning System) sensor, gyro sensor, acceleration sensor, etc. The sensor unit 14 includes a function as a position detection means for detecting positional information, receives a GPS satellite signal by the GPS sensor, and measures the positional information (latitude and longitude) of the onboard navigation device 10. Positioning by the sensor unit 14 is performed at a predetermined time interval (for example, 3 second interval) as mentioned above. The measured positional information is stored in the storage unit 12 as positional information 121.

It should be noted that the sensor unit 14 is able to further raise the positioning accuracy of positional information of the onboard navigation device 10 based on the angular speed and acceleration measured by the gyro sensor and acceleration sensor. In addition, the sensor unit 14, in the case of GPS communication being difficult or impossible, uses AGPS (Assisted Global Positioning System) communication, and is also able to calculate the positional information of the onboard navigation device 10 by base station information acquired from the communication unit 13.

The display unit 15 is configured by a liquid crystal display, or a display such as an organic electroluminescence panel. The display unit 15 receives instructions from the control unit 11, and displays an image. As information displayed by the display unit 15, for example, the current position of the onboard navigation device 10, map information of the vicinity of the current position of the onboard navigation device 10 read out from the map information, destination set by the user, meeting information notified from another onboard navigation device 10, route information, various user interfaces, etc. can be exemplified.

The input unit 16 is configured by an input device (omitted from illustration) such as physical switches called the numerical keypad, or a touch panel provided over the display surface of the display unit 15. By outputting to the control unit 11 a signal based on manipulation input from the input unit 16, for example, depression of the numerical keypad by a user, or touch of the touch panel, it is possible to realize a selection manipulation by the user, and manipulation such as scaling of the map.

It should be noted that, although not illustrated, it is also possible to include a speaker, microphone, etc. The speaker performs audio output to the driver, and the microphone collects the voice, etc. emitted by the driver. By configuring in this way, it is also possible to output information by sound from speakers, or input various selections, instructions by the driver audibly inputted via the microphone to the control unit 11 by voice recognition technology.

Next, an explanation will be made for the details of the control unit 11. The control unit 11 is configured by a microprocessor having a CPU (Central Processing Unit), RAM (Random access memory), ROM (Read Only Memory), I/O (Input/Output), etc. The CPU executes each program read out from the ROM or storage unit 12, and upon execution thereof, reads out information from the ROM and storage unit 12, performs writing of information in the RAM and storage unit 12, and performs transfer of signals with the communication unit 13, sensor unit 14, display unit 15 and input unit 16. Then, by configuring in this way, processing in the present embodiment is executed by the hardware and software (program) cooperating.

The control unit 11 includes a route guidance unit 111 and positional information transmission unit 112 as functional blocks.

The route guidance unit 111 is a portion which performs route guidance processing until a destination such as a facility inputted or selected by the user. The route guidance processing until the destination is equal to the route guidance processing of a general car navigation system. In other words, the route guidance unit 111 can perform route guidance by generating a map until the destination based on map information (omitted from illustration) stored in the storage unit 12, overlapping the current position of the onboard navigation device 10 measured by the sensor unit 14, the position of the destination, and the route information until the destination on this map, and displaying this on the display unit 15. In this case, it may be further configured so that the sound for route guidance is outputted from a speaker which is omitted from illustration. In addition, it may be configured so as to acquire information of the traffic status of roads, information of weather, etc. by communication from the communication unit 13, and use this acquired information in the route guidance processing. It should be noted that, since route guidance processing until a destination is well known to those skilled in the art, a detailed explanation more than this is omitted. In addition, since map information for performing route guidance processing is also well known to those skilled in the art, detailed explanation and illustration more than this is omitted.

The positional information transmission unit 112 is a portion which transmits positional information 121 and moving body identification information 122 stored in the storage unit 12 to the information analysis device 30, by way of wireless communication using the communication unit 13. The transmission of the positional information 121 and moving body identification information 122 to the information analysis device 30 by the positional information transmission unit 112 is performed periodically, from when the ignition switch of the vehicle 50*a* is turned ON (starting the engine) by the user riding in the vehicle 50*a*, the onboard navigation device 10 automatically starts, until the ignition switch of the vehicle 50*a* is turned OFF (stopping the engine). For example, every time the sensor unit 14 performs positioning at a predetermined time interval (for example, 3 second interval), transmission is performed in real time. In addition, it may be configured so as to transmit once collectively a plurality of units (for example, collecting moving body identification information 122 and positional information 121 updated at 3 second intervals during 3 minutes) rather than transmitting to the information analysis device 30 in real time. In other words, it may be configured so as to do so-called burst transmission. Therefore, it can be arbitrarily set according to the environment, etc. in which applying the present embodiment, the length of the predetermined time interval, when to transmit in real time, or to do burst transmission.

By configuring in this way, the positional information transmission unit 112 transmits to the information analysis device 30 the moving body identification information 122 and positional information 121 for specifying the movement route of the vehicle 50*a* positioned by the sensor unit 14, by performing real-time transmission or burst transmission.

In this case, the ignition switch is turned ON (starting engine), and it is possible to transmit to the information analysis device 30 the position specified by the positional information 121 measured immediately after the onboard navigation device 10 automatically started up as an initial vehicle position, i.e. departure position. Furthermore, it is possible to transmit to the information analysis device 30 the position specified by the positional information 121 measured immediately before the ignition switch is turned OFF (engine stop) as the final vehicle position, i.e. parking position.

In this case, it may be configured so as to transmit to the information analysis device 30, after adding to the positional information 121 the startup information indicating being positional information 121 representing the departure position, or the stop information indicating being positional information 121 representing the parking position. For example, it is sufficient if transmitting by setting a flag indicating as being startup information as 1, and transmitting by setting a flag indicating as being stop information as 1. It should be noted that the positional information 121 (i.e. parking position) measured immediately prior to the ignition switch being turned OFF (engine stop) may be transmitted upon the ignition switch being turned ON (starting engine), and the onboard navigation device 10 starting up again.

In addition, even in a case of performing burst transmission, in the case of the vehicle 50a being determined as arriving at the destination (e.g., certain facility) by way of the route guidance unit 111, it is sufficient if the positional information transmission unit 112 switches so as to perform transmission in real-time. So long as configuring in this way, before the positional information 121 of the parking position is transmitted after arrival at a certain facility, it is possible to prevent a situation in which the ignition switch is turned OFF (engine stop), and the positional information 121 of the destination such as a facility not being transmitted to the information analysis device 30.

<Functional Blocks Equipped to Mobile Terminal 20>

Figure 3:
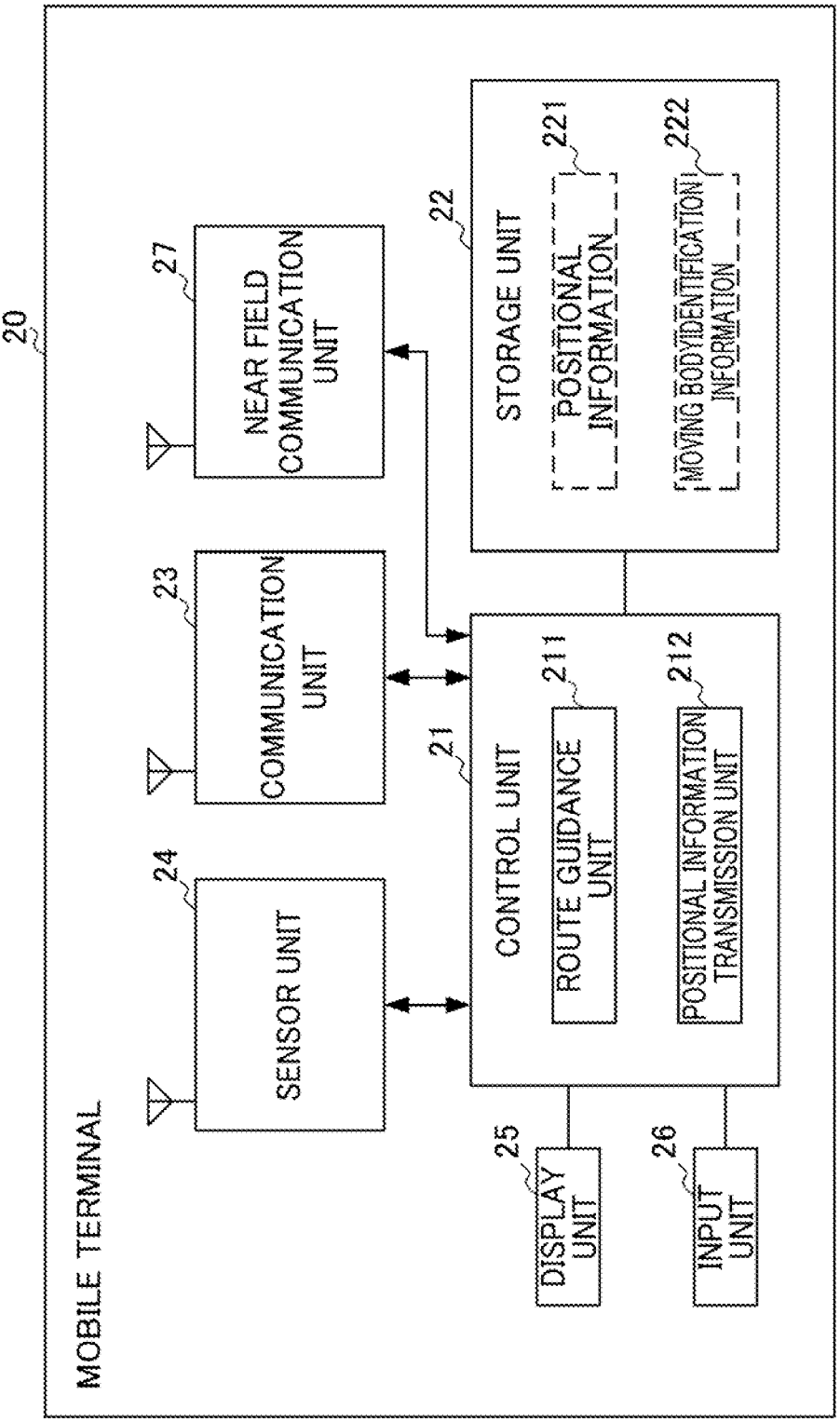
FIG. 3 is a functional block diagram showing the functional configuration of a mobile terminal according to an embodiment of the present invention.

Next, an explanation will be made for the functional blocks equipped to the mobile terminal 20 by referencing the block diagram of FIG. 3. Herein, the aforementioned onboard navigation device 10 receives the supply of power from the vehicle 50a; however, the mobile terminal 20 receives the supply of power from a battery (omitted from illustration) equipped to itself. However, it may be configured so that the mobile terminal 20 receives the supply of power from a cigarette lighter socket of the vehicle 50b, etc. in order to charge the battery.

As shown in FIG. 2, the mobile terminal 20 is configured to include the control unit 21, storage unit 22, communication unit 23, sensor unit 24, display unit 25, input unit 26 and near field communication unit 27. Herein, the control unit 21, storage unit 22, communication unit 23, sensor unit 24, display unit 25 and input unit 26 have equivalent functions as the functional blocks of the same name included by the aforementioned onboard navigation device 10. In other words, by switching the wording of "onboard navigation device 10" with the wording of "mobile terminal 20" in the explanation of the aforementioned onboard navigation device 10, it becomes the explanation of each functional block of the mobile terminal 20; therefore, redundant explanations again will be omitted.

On the other hand, with regards to the mobile terminal 20, due to differing from the onboard navigation device 10 in the point including the near field communication unit 27, etc., the following explanation is made for this point of difference. The near field communication unit 27 is a portion for performing non-contact near field communication according to a standard such as NFC (Near Field Communication) or Bluetooth (registered trademark), or near field communication by wire via a USD (Universal Serial Bus) cable or the like. On the other hand, the vehicle 50b includes a near field communication unit for performing communication with a near field communication unit 27. For example, the ECU (Electronic Control Unit) of the vehicle 50b includes a near field communication unit. Then, a case of the mobile terminal 20 being able to communication by near field communication with the ECU is a case of the mobile terminal 20 existing inside of the vehicle 50b. In this case, the positional information measured by the sensor unit 24 of the mobile terminal 20 comes to correspond to the positional information of the vehicle 50b.

Therefore, the mobile terminal 20 causes the positional information transmission unit 212 to startup while near field communication with the ECU is possible via the near field communication unit 27. Then, the started positional information transmission unit 212 transmits to the information analysis device 30 the positional information 221 for specifying the movement route of the vehicle 50b positioned by the sensor unit 24, and the moving body identification information 222, similarly to the positional information transmission unit 112 of the onboard navigation device 10.

For example, when the user gets into the vehicle 50b possessing the mobile terminal 20, and turns ON the start switch of the vehicle 50b such as the ignition switch, the vehicle 50b and mobile terminal 20 are connected (pairing), and the positional information 221 measured by the mobile terminal 20 and the moving body identification information 222 are transmitted from the mobile terminal 20 to the information analysis device 30. In this case, it is possible to transmit to the information analysis device 30 the position specified by the positional information 121 measured immediately after pairing of the vehicle 50b and mobile terminal 20 as an initial vehicle position, i.e. departure position.

Furthermore, when the start switch of the vehicle 50b such as the ignition switch is turned OFF, pairing between the vehicle 50b and mobile terminal 20 is released. In this case, it is possible to transmit to the information analysis device 30 the position specified by the positional information 121 measured immediately before released as the last vehicle position, i.e. parking position. In this case, it is similar to the positional information transmission unit 112 also in the point in that it may be transmitted in real time or may be burst transmission, the point in that burst transmission may be switched to transmission in real time in the case of determining as having arrived at the parking position, the point in that startup information and stop information indicating the departure position or parking position may be added, and the point in that the parking position at the time of restarting may be transmitted.

It should be noted that, in the case of the vehicle 50b having a function of measuring positional information, it may be configured so as to transmit to the information analysis device 30 the positional information measured by the vehicle 50b, rather than the positional information measured by the sensor unit 24, as the positional information 121. In this case, it may be configured so as to omit the sensor unit 24 from the mobile terminal 20.

<Functional Blocks Equipped to Information Analysis Device 30>

Next, an explanation will be made for the functional blocks equipped to the information analysis device 30 by referencing the block diagram of FIG. 4.

Figure 4:
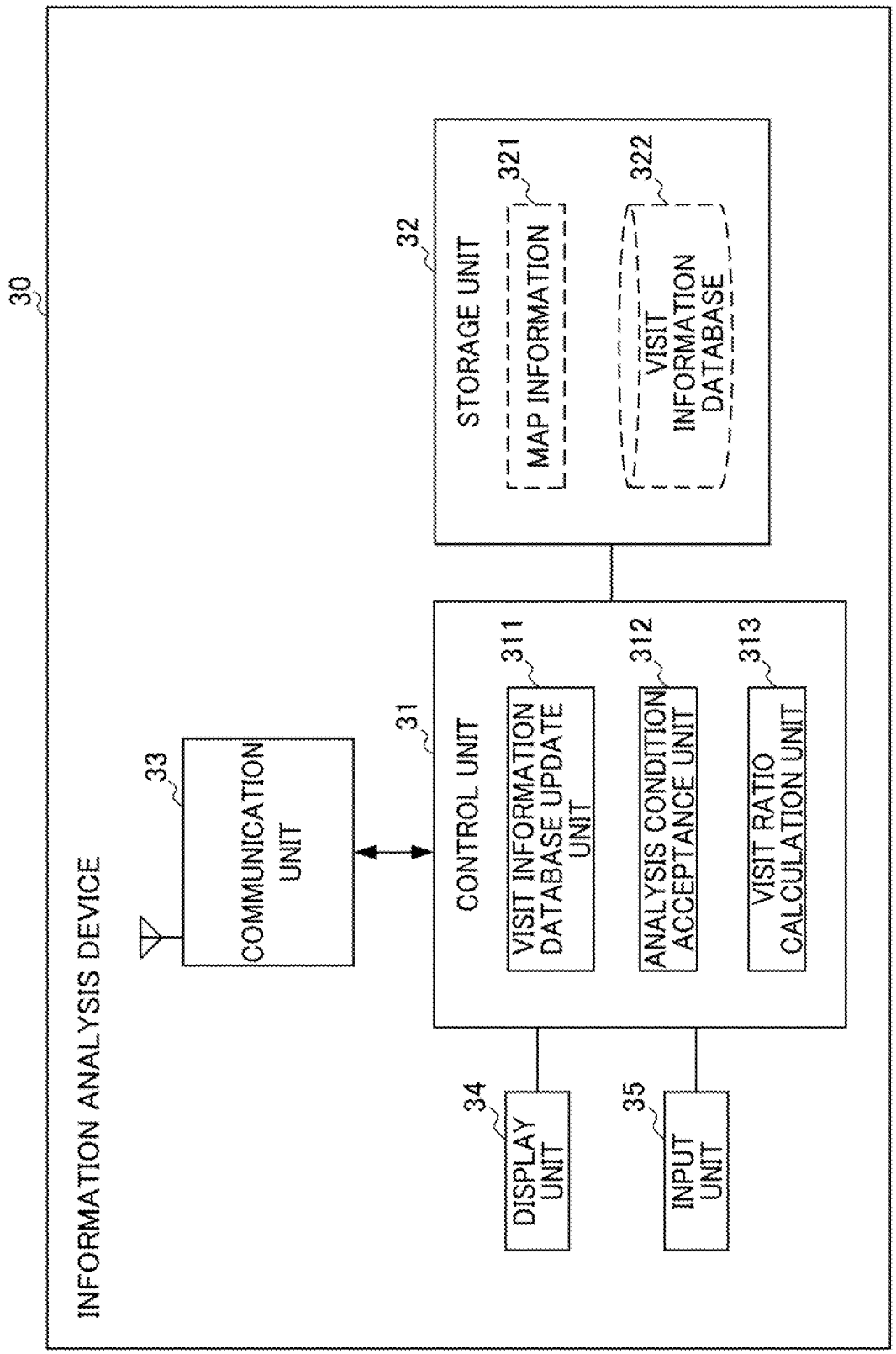
FIG. 4 is a functional block diagram showing the functional configuration of an information analysis device according to an embodiment of the present invention.

As shown in FIG. 4, the information analysis device 30 is configured to include a control unit 31, storage unit 32, and communication unit 33.

The control unit 31 is configured from an arithmetic processing device such as a microprocessor, and performs control of each part constituting the information analysis device 30. The details of the control unit 31 will be described later.

The storage unit 32 is configured by semiconductor memory or the like, and stores each program such as a program for control called firmware or an operating system, and a program for performing information analysis processing, and further various information such as map information. The drawing illustrates map information 321 and a visit information database 322, which are information particularly related to analysis processing of the positional information, as information stored by the storage unit 32.

The map information 321 includes information such as information related to features such as roads and facilities, road information, facility positional information and parking information. In addition, display map data for displaying the background such as roads and road maps; road network data which includes position information of nodes (for example, junctions of roads, inflection points, end points, etc.) and classification information thereof, position information of links which are paths coupling between each node and classification information thereof, link cost data related to cost information of all links (for example, distance, required time, etc.); and the like are included in the map information 321.

The position and shape of roads, and information of so-called road map such as the classification of roads, position of traffic lights, etc. are saved as road information. As the facility position information, the positional information of each facility is saved as information of longitude and latitude. In addition, additional information such as facility information related to the moving body identification information of a facility (facility ID), name, facility classification (and/or genre), telephone number, address, business hours, and if the facility is a restaurant, the menu served, product service, etc. may be included as facility positional information. The positional information of parking is saved as information of longitude and latitude as parking information. In the case of the parking being parking of each facility, it is saved by associating the facility and parking.

The map information 321 may be established as a configuration stored in advance in the storage unit 32, or may be established as a configuration which is appropriately downloaded as needed from a server device (omitted from illustration) connected to the communication network 40. Furthermore, it may be appropriately modified according to the input of the user, etc.

The visit information database 322 is a database constructed based on the positional information 121 and positional information 221, and the moving body identification information 122 and moving body identification information 222 received from the onboard navigation device 10 and mobile terminal 20, respectively. The visit information database 322 is constructed from a visit information database update unit 311 described later. Details of the visit information database 322 are described later upon explanation of the visit information database update unit 311. It should be noted that, in the following explanation, upon explaining the positional information 121 and positional information 221 without distinguishing therebetween, they are called "positional information" by omitting the reference symbol. In addition, similarly, upon explaining without distinguishing between the moving body identification information 122 and moving body identification information 222, they are called "moving body identification information" by omitting the reference symbol.

The communication unit 33 has a DPS or the like, and realizes wireless communication with other devices via the communication network 40, based on the communication standard such as 3G, LTE, 4G or Wi-Fi (registered trademark). The communication unit 33, for example, is used in order to receive the positional information and moving body identification information transmitted from each of the onboard navigation device 10 and mobile terminal 20. However, there are no particular limitations in the data transmitted between the communication unit 33 and other device, and may be configured so that information other than these types of information are transmitted.

Next, an explanation will be made for the details of the control unit 31. The control unit 31 is configured by a microprocessor having a CPU, RAM, ROM, I/O, etc. The CPU executes each program read out from the ROM or storage unit 32, reads out information from the RAM, ROM and storage unit 32 upon execution thereof, performs writing of information in the RAM and storage unit 32, and performs transfer of signals with the communication unit 33, display unit 34 and input unit 35. Then, by configuration in this way, processing of the present embodiment is realized by the hardware and software (programs) cooperating.

The control unit 31 includes the visit information database update unit 311, analysis conditions acceptance unit 312, and visit ratio calculation unit 313, as functional blocks. The visit information database update unit 311 is a portion which constructs the visit information database 322, and appropriately updates the visit information database 322. An example of the data structure of the visit information database 322 will be explained by referencing FIG. 5.

As shown in FIG. 5, the visit information database 322 includes "facility identification information" for identifying a facility visited by the vehicle 50. In addition, the visit information database 322 includes "moving body identification information" received from the onboard navigation device 10 of the vehicle 50 and the mobile terminal 20 having visited a facility corresponding to the facility identification information. Furthermore, the visit information database 322 includes "movement date/time" and "movement route information" specified by the visit information database update unit 311, based on the "positional information" received from the onboard navigation device 10 of the vehicle 50 and mobile terminal 20 having visited a facility corresponding to the facility identification information. Then, the visit information database update unit 311 constructs and updates the visit information database 322, by storing each of these sets of information in corresponding fields in the visit information database 322.

The "facility identification information" in the visit information database 322 is information for identifying a facility visited by the vehicle 50, and is acquired from the aforementioned map information 321. As the facility identification information, for example, it is possible to use numerals or Latin characters uniquely assigned to the facility, facility name, telephone number of the facility or the like.

The "movement date/time" in the visit information database 322 is information indicating the date/time on which the vehicle 50 corresponding to the moving body identification information moved. In the present embodiment, for example, from when transmission of positional information from any onboard navigation device 10 or mobile terminal 20 is started once until finished is handled as one movement. Then, the date/time corresponding to this one movement is stored in the visit information database 322 as the movement date/time.

The "moving body identification information" in the visit information database 322 is information for identifying the onboard navigation device 10 or mobile terminal 20, which is the sender of the positional information as mentioned above. In other words, it is information identifying the vehicle 50 corresponding to the onboard navigation device 10 or mobile terminal 20.

The "movement route information" in the visit information database 322 is information indicating the movement route specified based on all of the positional information which changes in a time discrete manner, received during one movement. The visit information database update unit 311 can specify the movement route of the vehicle 50, by linking the positional information which changes in a time discrete manner. It should be noted that, in the environment in which implementing the present embodiment, in a case such that the accuracy of the positional information is low, the visit information database update unit 311 may be configured so as to specify the movement route by performing map matching which checks between the map information 321 and positional information. However, in a case such that the accuracy of the positional information is high, it is unnecessary to perform map matching.

The visit information database update unit 311 updates the visit information database 322 by storing the aforementioned respective information in a new field, based on the received positional information and moving body identification information, every time the transmission of positional information and moving body identification information from any of the onboard navigation device 10 or mobile terminal 20 is once started, and then finishes.

In addition, the visit information database update unit 311 must specify which vehicle 50 has visited which facility, upon constructing and updating the visit information database 322. For this reason, the visit information database update unit 311 specifies a position at which the user parked with the vehicle 50, from the received positional information. For example, as mentioned above, if information indicating the parking position is included in the positional information, it specifies the position at which parked by this information. In addition, in a case assuming that information indicating the parking position is not included in the positional information, it can be regarded that the position corresponding to the last received positional information, or a position not changing for a fixed time is the parking position, while transmission of positional information is started until finished.

Then, the visit information database update unit 311 compares the specified parking position and position of each facility included in the map information 321 (and position of parking lot associated with facility), and determines that the vehicle 50 visited a matching facility, in the case of the specified parking position and the position of any facility (and position of parking lot associated with facility) matching. Then, it is determined to receive before receiving positional information corresponding to the parking position of this road trip. It should be noted that it may be configured to arbitrarily decide the degree of "matching" of the position of a facility with the parking position. For example, in a case such that the onboard navigation device 10 or mobile terminal 20 can accurately measure positional information, it may be configured to narrow the range of determining as matching. On the other hand, in a case such that the onboard navigation device 10 or mobile terminal 20 cannot measure the positional information so accurately, it may be configured so as to widen the range of determining as matching. In other words, it may be configured so as to determine as matching in the case of the positions being slightly shifted. It should be noted that it may be configured so that the user of the information analysis device 30 appropriately corrects the visit information database 322.

The analysis condition acceptance unit 312 is a portion which accepts the analysis conditions. As mentioned above, the analysis conditions are conditions inputted by the user for obtaining the desired analysis information. The analysis condition acceptance unit 312 creates a user interface for accepting input of analysis conditions from the user, and causes the generated user interface to be displayed on the display unit 34 realized by a display. The user inputs the analysis conditions to the input unit 35 inputted by the input interface such as a keyboard, mouse, etc., by referencing this user interface.

Herein, the analysis conditions include a designation of facilities defined as analysis targets, for example. In addition, the analysis condition may include designation of the analysis method, designations related to a time period defined as an analysis target, designation of a time slot defined as the analysis target, etc. For example, in the case of the user having a desire such as "want to know moving body visit ratio on each day in September for facility A", the user inputs as analysis conditions contents such the "facility identification information" of this facility A, designation of "moving body visit ratio" which is the analysis method, and "each day in September" related to the period for defining the analysis target, using the input unit 35. The analysis condition acceptance unit 312 generates analysis conditions based on these inputs. In addition, the analysis condition acceptance unit 312 outputs the generated analysis conditions to the visit ratio calculation unit 313.

The visit ratio calculation unit 313 is a portion which generates analysis information according to the analysis conditions inputted from the analysis condition acceptance unit 312, based on the map information 321, and the respective information stored in the visit information database 322. For the generation of analysis information, the visit ratio calculation unit 313 first specifies the facility (hereinafter called "target facility") defined as the analysis target designated in the analysis conditions inputted from the analysis condition acceptance unit 312, based on the map information 321. For example, if being an example of the aforementioned analysis conditions, the visit ratio calculation unit 313 specifies the facility A as the target facility.

In addition, the visit ratio calculation unit 313 further specifies a region corresponding to the specified target facility (hereinafter called "corresponding region") based on the map information 321. This corresponding region is a region requiring to pass through in order to visit the target facility, for example, is a region of road adjacent to the entrance to the facility or the parking lot of the facility. It should be noted that, in the case of a plurality of entrances or parking lots existing for one facility, a plurality of corresponding regions will also come to exist for one facility accordingly.

Next, the visit ratio calculation unit 313 specifies the vehicle 50 which has passed through the corresponding region, based on the movement route of a vehicle 50 specified by the movement information included in the visit information database 322. Then, the visit ratio calculation unit 313 calculates the number of vehicles 50 having passed through the corresponding region. For example, if being an example of the aforementioned analysis conditions, the visit ratio calculation unit 313 calculates the number of vehicles 50 having passed through the corresponding region of facility A in September for each day.

In addition, the visit ratio calculation unit 313 calculates the number of vehicles 50 visiting the target facility, by referencing the visit information database 322. For example, if being an example of the aforementioned analysis conditions, the visit ratio calculation unit 313 calculates the number of vehicles 50 having visited the facility A in September for each day. Furthermore, the visit ratio calculation unit 313 calculates the moving body visit ratio, by dividing the calculated number of vehicles 50 having visited the target facility by the calculated number of vehicles 50 having passed through the corresponding region. For example, if being an example of the aforementioned analysis conditions, the visit ratio calculation unit 313 calculates the moving body visit ratio of each day in September.

By configuring in this way, the visit ratio calculation unit 313 can perform analysis based on information such as positional information acquired from the vehicle 50 that is the moving body. This moving body visit ratio is a ratio taking consideration of the number of vehicles 50 having passed through the corresponding region (total number), not only the number of visits to the target facility. In other words, according to the present embodiment, it is possible to perform more detailed analysis by also taking consideration of information other than the number of visits.

In addition, the visit ratio calculation unit 313 presents this moving body visit ratio to the user, by displaying on the display unit 34 as analysis information. FIG. 6 shows a display example of analysis information. What is shown in FIG. 6 is a display example of analysis information based on the example of the aforementioned analysis conditions. As illustrated, the "number of passing in front of facility (thousands)" which is the number of vehicles 50 having passed through the corresponding region of facility A, "number of visits (vehicles)" which is the number of vehicles 50 having visited facility A, and "moving body visit ratio (%)" calculated from these are displayed for each day in September according to the analysis conditions.

The user can grasp the moving body visit ratio, etc. calculated based on the analysis conditions, by referencing this display. The point of the user being able to use the analysis information presented from this information analysis device 30 in various applications is as mentioned above. It should be noted that the visit ratio calculation unit 313 may be configured so as to transmit the moving body visit ratio that is analysis information to another device other than displaying on the display unit 34. Then, this other device may be configured so as to present the moving body visit ratio that is analysis information to the user. In addition, the visit ratio calculation unit 313 may be configured so as to cause the moving body visit ratio that is the analysis information to be stored in the storage unit 32, or the storage unit of another device.

Operation of Present Embodiment

Figure 8:
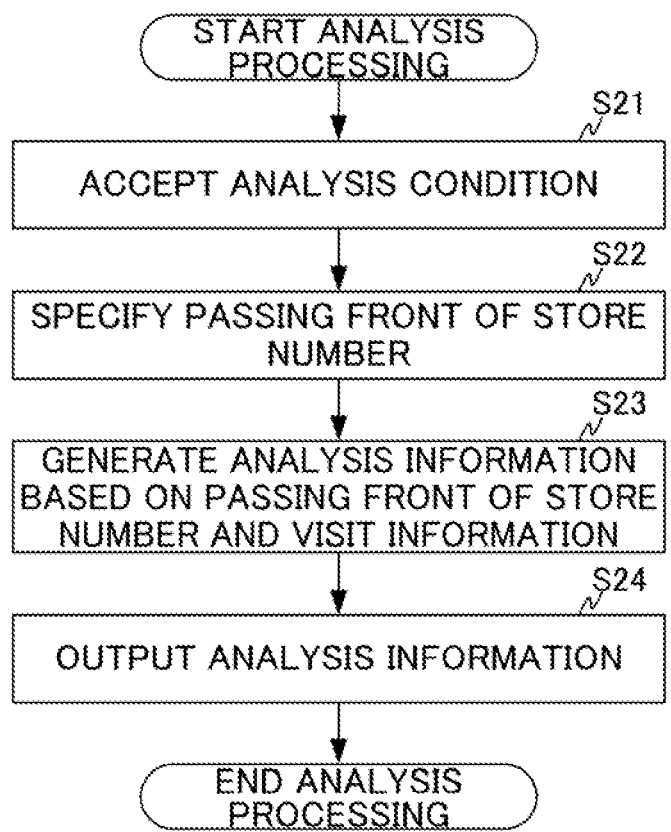
FIG. 8 is a flowchart showing basic operations during analysis processing according to an embodiment of the present invention.

Next, the operation of the present embodiment will be explained by referencing the flowcharts of FIGS. 7 and 8. Herein, FIG. 7 is a flowchart showing the operation during collection of positional information and update of the visit information database 322, performed by the visit information database update unit 311 exclusively. In addition, FIG. 8 is a flowchart showing operation during analysis processing, performed by the analysis condition acceptance unit 312 and visit ratio calculation unit 313 exclusively.

First, operation in the case of updating the visit information database 322 by the positional information collected from the onboard navigation device 10 will be explained by referencing FIG. 7. It is determined whether the positional information transmission unit 112 starts transmission of the positional information (Step S11). Herein, as mentioned above, transmission is started in a case of the ignition switch of the vehicle 50a being turned ON. In the case of the ignition switch being left OFF (NO in Step S11), transmission by the positional information transmission unit 112 is not started. On the other hand, in the case of the ignition switch being turned ON (YES in Step S11), the processing advances to Step S12.

In Step S12, the sensor unit 14 acquires positional information by measuring the position of the onboard navigation device 10 (Step S12). The positional information transmission unit 112 acquires positional information from the sensor unit 14, and does real-time transmission or burst transmission of the acquired positional information at predetermined periods to the information analysis device 30 (Step S13).

Next, it is determined whether the positional information transmission unit 112 ends transmission of the positional information (Step S14). As mentioned above, in the case of the ignition switch of the vehicle 50a being turned OFF, the transmission comes to an end. In the case of the ignition switch of the vehicle 50a being left ON (NO in Step S14), the positioning of Step S12 and the transmission of Step S13 are repeated.

On the other hand, in the case of the ignition switch of the vehicle 50a being turned OFF (YES in Step S14), the processing advances to Step S15.

In Step S15, the visit information database update unit 311 of the information analysis device 30 updates the visit information database 322 based on the positional information sent by repeating Step S12 and Step S13 (Step S15). By the above explained operation, the collection of positional information and update of the visit information database are realized.

Next, operation in the case of updating the visit information database 322 by the positional information collected from the mobile terminal 20 will be explained by referencing FIG. 7. In this case, in the above explained made referencing FIG. 7, the positional information transmission unit 112 may be replaced with the positional information transmission unit 211, the sensor unit 14 may be replaced with the sensor unit 24, the reference of being YES in Step S11 may be replaced with "case of start switch of the vehicle 50b such as the ignition switch being turned ON and the vehicle 50b and mobile terminal 20 pairing", and the reference of being YES in Step 14 may be replaced with "case of start switch of the vehicle 50b such as the ignition switch being turned OFF, and the pairing between the vehicle 50b and mobile terminal 20 being released". Therefore, redundant explanations are omitted.

Next, an explanation will be made for the operation during analysis processing by referencing the flowchart of FIG. 8. First, the analysis condition acceptance unit 312 accepts analysis conditions from the user via the input unit 35 (Step S21). The analysis condition acceptance unit 312 outputs the accepted analysis conditions to the visit ratio calculation unit 313.

The visit ratio calculation unit 313 specifies the target facility and target region, based on the analysis conditions and map information 321. Then, the visit ratio calculation unit 313 calculates the number of vehicles 50 having passed through the corresponding region, based on the movement route of the vehicle 50 specified by the movement information included in the visit information database 322 (Step S22).

The visit ratio calculation unit 313 calculates the number of vehicles 50 having visited the target facility by referencing the visit information database 322, and calculates the moving body facility ratio by dividing the calculated number of vehicles 50 having visited the target facility, by the number of vehicles 50 having passed through the corresponding region calculated in Step S22 (Step S23).

The visit ratio calculation unit 313 presents to the user by displaying this moving body visit ratio on the display unit 34 as analysis information (Step S24). The display example in this case is as mentioned above by referencing FIG. 6. In addition, the point of the user being able to use the analysis information presented from this information analysis device 30 in various applications is as mentioned above.

According to the operation of the present embodiment explained above, it becomes possible to perform more detailed analysis based on information such as positional information of vehicles 50, which are moving bodies. In addition, it is possible to present this more detailed analysis result to the user.

Modified Example

The aforementioned embodiment is a preferred embodiment of the present invention; however, it is not to limit the scope of the present invention to only the above embodiment, and implementation in modes arrived at by conducting various modifications in a range not departing from the gist of the present invention is possible. For example, implementation is possible in a mode arrived at by conducting modifications such as the respective modified examples explained below.

First Modified Example

In the aforementioned embodiment, the visit ratio calculation unit 313 calculated the moving body visit ratio, by dividing the number of vehicles 50 having visited the target facility by the number of vehicles 50 having passed through the corresponding region. In this case, it may be configured so as to perform analysis by taking consideration of whether the vehicles 50 having visited the target facility passed the corresponding region and turned right or turned left into the target facility.

In this case, the visit ratio calculation unit 313 determines whether each of the vehicles 50 passed through the corresponding region and turned right or turned left into the target facility, based on the movement route of the vehicle 50 specified by the movement information included in the visit information database 322. Then, the visit ratio calculation unit 313 calculates at least either or both of the moving body visit ratio to the target facility for vehicles 50 having turned right, and moving body visit ratio to the target facility for vehicles 50 having turned left, based on the determination results. Then, the visit ratio calculation unit 313 presents these calculated moving body visit ratios as analysis information to the user by a method such as display on the display unit 34.

According to the present modified example, it is possible to perform analysis taking consideration of whether turning right or turning left to the target facility. In other words, it is possible to perform more detailed analysis. In addition, it is possible to present this more detailed analysis result to the user.

Second Modified Example

Modifying the aforementioned embodiment, it may be configured so that the visit ratio calculation unit 313 calculates a virtual moving body visit ratio. In this case, the analysis condition acceptance unit 312 accepts from the user a designation of any position on the road in the map information 321, as analysis conditions. In addition, the visit ratio calculation unit 313 calculates the moving body visit ratio to another facility existing on the same road as this designated position. Then, the visit ratio calculation unit 313 regards this calculated moving body visit ratio to another facility as a virtual moving body visit ratio in a case of a facility existing at any position on the road designated from the user. Then, the visit ratio calculation unit 313 presents to the user this virtual moving body visit ratio as analysis information by a method such as display on the display unit 34. According to the present modified example, a user considering opening a shop such as a new store can perform prediction of the number of visitors, since it is possible to calculate a virtual moving body visit ratio even in the case of the facility not actually existing.

It should be noted that the visit ratio calculation unit 313 may be configured to calculate the moving body visit ratio to another facility existing on the same road as a position designated from the user for a plurality of facilities, and define an average value for the moving body visit ratios of this plurality of facilities as the virtual moving body visit ratio. In this case, the visit ratio calculation unit 313 may be configured, for example, so as to accept designation such as the business of the facility, and define the average value of moving body visit ratios for a plurality of facilities of the same business as the virtual moving body visit ratio.

In addition, it may be configured so that the user causes the virtual moving body visit ratio of facilities actually existing to be calculated by designating the position at which facilities actually exist. The user can grasp whether or not this facility has an ability to attract customers compared to other facilities, by comparing the actual moving body visit ratio of this facility calculated by the aforementioned embodiment, and the virtual moving body visit ratio calculated by the present modified example.

Other Modified Examples

As another modified example, the onboard navigation device 10 or mobile terminal 20 may be realized by another device without a route guidance function. In other words, the route guidance function by the onboard navigation device 10 or mobile terminal 20 is not an essential configuration. In this case, the information analysis device 30 further includes the route guidance function, and the information analysis device 30 may be configured to perform route guidance by performing communication with the onboard navigation device 10 or mobile terminal 20.

In addition, as another modified example, although the aforementioned embodiment is explained as realizing the information analysis device 30 by one server device or the like, it may be established as a distributed processing system which distributes each function of the information analysis device 30 to a plurality of server devices as appropriate. Moreover, it may realize each function of the information analysis device 30 using a virtual server function or the like on a cloud. In other words, the functional configurations of FIGS. 2, 3 and 4 are merely exemplifications, and are not to limit the functional configurations of the present embodiment. In other words, it is sufficient if the functions which can be execute a series of processing related to the information analysis function of the present invention as a whole are equipped to each device, and what kind of functional block is used in order to realize this function is not particularly limited to the examples of FIGS. 2, 3 and 4.

<Regarding Hardware and Software>

It should be noted that each of the respective devices included in the above-mentioned navigation system can be realized by hardware, software, or a combination thereof. In addition, the navigation method performed by each of the respective devices included in the above-mentioned navigation system cooperating can also be realized by hardware, software or a combination of these. Herein, being realized by software indicates the matter of being realized by a computer reading and executing a program.

The program can be stored using various types of non-transitory computer readable media, and supplied to the computer. Non-transitory computer readable medium includes various types of tangible storage media. Examples of non-transitory computer readable media include magnetic recording media (e.g., flexible disk, magnetic tape, hard disk drive), magneto-optical recording media (e.g., magneto-optical disk), CD-ROM (Read Only Memory), CD-R, CD-R/W and semiconductor memory (e.g., mask ROM, PROM (programmable ROM), EPROM (Erasable PROM), flash ROM, RAM (random access memory)). In addition, the program may be supplied to the computer by way of various types of transitory computer readable media. Examples of transitory computer readable media include electrical signals, optical signals and electromagnetic waves. Transitory computer readable media can supply programs to the computer via wired communication paths such as electric wires and optical fiber, or wireless communication paths.

EXPLANATION OF REFERENCE NUMERALS 1 information analysis system
10 onboard navigation device
11, 21, 31 control unit
111, 211 route guidance unit
112, 212 positional information transmission unit
12, 22, 32 storage unit
121, 221 positional information
122, 222 moving body identification information
13, 23, 33 communication unit
14, 24 sensor unit
15, 25, 34 display unit
16, 26, 35 input unit
20 mobile terminal
27 near field communication unit
30 information analysis device
311 visit information database update unit
312 analysis condition acceptance unit
313 visit ratio calculation unit
321 map information
322 visit information database
40 communication network
50a, 50b vehicle

The invention claimed is:

1. An information analysis device comprising:
an input unit, which inputs analysis conditions including a facility designated as an analysis target, and a time period and/or time slot designated as an analysis target;
a receiving unit, which receives positional information of a plurality of moving bodies;
a map information storage unit, which stores map information including roads, which can be travelled by the plurality of moving bodies, and a position of a facility adjacent to a road, which can be visited by the plurality of moving bodies;
a visit ratio calculation unit, which specifies a number of moving bodies having entered from the road adjacent to the facility and visited the facility, and a number of moving bodies having passed the road adjacent to the facility based on the positional information and the map information, as well as the facility designated as an analysis target via the input unit, and the time period and/or time slot designated as an analysis target, and calculates a moving body visit ratio to the facility, based on specification results; and
a display unit which displays, as analysis information, a moving body visit rate according to the analysis conditions.

2. The information analysis device according to claim 1, wherein the visit ratio calculation unit calculates the moving body visit ratio by dividing a number of moving bodies having entered from the road adjacent to the facility and visited the facility, by a number of moving bodies having passed the road adjacent to the facility.

3. The information analysis device according to claim 1, wherein the visit ratio calculation unit
further specifies whether the moving body turned right or turned left to the facility from a road, based on the positional information and the map information, and
calculates either one or both of the moving body visit ratio to the facility for moving bodies that turned right, and a moving body visit ratio to the facility for moving bodies that turned left.

4. The information analysis device according claim 1, wherein any position on a road is designated in the map information via the input unit,
wherein the visit ratio calculation unit calculates, relative to a position designated by the input unit, a virtual moving body visit ratio using a moving body visit ratio to a facility existing on a road that is the same as the position designated by way of the input unit.

5. An information analysis method performed by a computer, the method comprising the steps of:
inputting analysis conditions including a facility designated as an analysis target and a time period and/or time slot designated as an analysis target;
receiving positional information of a plurality of moving bodies;
storing map information, which includes roads, which can be travelled by the plurality of moving bodies, and a position of a facility adjacent to a road, which can be visited by the plurality of moving bodies;
specifying a number of moving bodies having entered from the road adjacent to the facility and visited the facility and a number of moving bodies having passed the road adjacent to the facility based on the positional information and the map information, as well as the facility designated as an analysis target via the input unit, and the time period and/or time slot designed as an analysis target, and calculating a moving body visit ratio to the facility, based on a result of specifying, and
displaying, as analysis information, a moving body visit rate according to the analysis conditions.

* * * * *